Patented Nov. 6, 1945

2,388,549

UNITED STATES PATENT OFFICE 2,388,549

HIGH TEMPERATURE INSULATING SHAPE AND METHOD OF MANUFACTURE

Henry A. Kieselbach, Montclair, and Earl R. Williams, North Plainfield, N. J., assignors to Johns-Manville Corporation, New York, N. Y., a corporation of New York No Drawing. Application December 15, 1942, Serial No. 469,122

3 Claims. (Cl. 92—54)

The present invention relates to high temperature insulating blocks or shapes, and is particularly concerned with high temperature insulating shapes incorporating diatomaceous silica as a major ingredient.

The high-temperature insulating shape and method of manufacturing same, which form the subject of the present invention, represent improvements on the Heat insulating composition and method of making which is described in U. S. Patent #2,033,106 granted March 3, 1936 to Arthur B. Cummins. Insulating blocks of the type described in the Cummins patent develop considerable shrinkage during the period of manufacture and cannot therefore be molded to precise dimensions; so that such blocks must be molded and thereafter planed down to desired dimensions for use. The manufacture of finished blocks by such method is therefore costly and time-consuming, and involves considerable loss of material in the form of trimming waste.

A primary object of the present invention is to provide an improved method of manufacturing high temperature insulating shapes incorporating diatomaceous silica as a principal ingredient whereby such shapes can be molded and cured to precise dimensions, eliminating subsequent costly and wasteful planing and trimming operations.

A more particular object of the present invention is to provide a precision molded heat-insulating shape adapted for use at elevated temperatures in the neighborhood of 2000° F. and having improved strength and insulation capacity at such elevated temperatures and also at normal temperatures.

With the above and other objects and features in view, the invention consists in the improved high temperature insulation shape and method of manufacture hereinafter described and more particularly defined in the appended claims.

The insulation shape which forms the subject of the present invention incorporates diatomaceous silica as a principal ingredient. The diatomaceous silica is preferably subjected to a preliminary calcination treatment; and a relatively small amount of a suitable flux such as sodium carbonate may be added prior to calcination.

The high temperature insulating blocks herein described differ primarily from the blocks described in the aforementioned Cummins patent in that the principal bonding agent which is used in their manufacture by the present invention comprises self-setting normal magnesium carbonate, rather than pre-formed basic magnesium carbonate. The invention is based on the observation that a strong, high temperature resistant insulation block can be formed from a mixture of diatomaceous silica, asbestos fibres and normal magnesium carbonate, and that such block can be cast to precise dimensions and cured to a strong product providing that the casting or molding and curing operations are carried out under suitably controlled conditions of temperature and superatmospheric pressure. For molding the precise dimensions a block containing a high proportion of diatomaceous silica, it is essential that the molding and curing operations be carried out in molds having pervious walls and under moderate superatmospheric pressures. It is also desirable to incorporate in the composition a small amount of bentonite as an additional bonding agent which improves the strength of the block, particularly at high temperatures, apparently by reaction in situ with the silica to form a strong silicate at temperatures in the neighborhood of 2000° F.

In the manufacture of heat insulating shapes in accordance with the present invention, the following illustrative method may be practiced: In case bentonite is used as one of the bonding components of the mixture, it is first thoroughly hydrated by agitation with water in a suitable agitator mixer. At the same time there is prepared an aqueous suspension of finely-divided normal magnesium carbonate crystals. Such suspension may be made by carbonating a dilute aqueous suspension of finely-divided hydrated magnesia under conditions to produce normal magnesium carbonate ($MgCO_3 \cdot 3H_2O$) directly, or else a solution of magnesium bicarbonate may be heated under conditions to produce the normal carbonate. Asbestos fibres and calcined diatomaceous silica may be added to the hydrated magnesia or bicarbonate before the treatment converting it to normal carbonate, or the asbestos and diatomaceous silica may be added after formation of the normal carbonate suspension. After suitable hydration of the bentonite, and after formation of the aqueous suspension of normal magnesium carbonate slurry, asbestos fibres and calcined diatomaceous silica, the hydrated bentonite and aqueous normal carbonate suspension are combined, and the slurry thus formed may then be dewatered or adjusted to a suitable consistency. In preparing the magnesium carbonate slurry the treatment should be such as to convert at least a substantial proportion of the magnesia content to normal or hydrated self-setting magnesium carbonate.

Following the step of adjusting the consistency of the slurry to a suitable concentration, which may be approximately 7½% by weight of solids, the slurry is introduced under a pressure of 10 to 25 lbs. into a pressure filter mold which is dimensioned to produce a block of the desired shape and which is provided with perforated walls to allow for drainage of water from the mold. A suitable mold, for example, may be one dimensioned to produce a block 36 inches by 6 inches by 2 inches (36" x 6" x 2"). The mold should is then removed from the mold and subsequent completion of the setting operation is effected in the usual air-drying oven at a temperature of 200–210° F.

The following formulae illustrate various compositions of molding mixtures for high temperature insulating blocks having particularly desirable properties in accordance with this invention:

|  | Formula I | Formula II | Formula III | Formula IV | Formula V |
|---|---|---|---|---|---|
|  | Percent | Percent | Percent | Percent | Percent |
| Asbestos fibre | 12 | 12 | 12 | 12 | 12 |
| Bentonite |  | 6 | 5 | 3 |  |
| Normal magnesium carbonate crystals | 10 | 10 | 20 | 50 | 50 |
| Calcined diatomaceous silica |  | 72 | 63 | 35 | 38 |
| Natural diatomaceous silica | 78 |  |  |  |  | have at least 75% of its wall area perforated and preferably provided with canvas or other fine mesh textile or fine wire screen covering, whereby it will be possible to dewater the mold charge without substantial loss of slurry solids under the comparatively low pressure at which the charging operation is carried out. The operation of charging the mold should follow, with as little delay as possible, the operation whereby the suspension of finely-divided normal magnesium carbonate crystals is formed. A preferred mold is one which can be mounted in a filter press frame and in which the perforated mold side walls either form, or abut on, a perforated side of a drainage and steam jacket. With drainage and steam jackets thus located on each side of the mold and provided with suitable water outlets and steam inlets, it is possible to effect rapid drainage of water from the mold charge under hydrostatic or pump pressure maintained on the slurry during the period of charging the mold and of dewatering the charge; and to thereafter use such steam jackets for introduction of hot steam into direct contact with the mold charge during the subsequent curing operation wherein the mold charge is cured by heating to convert the normal magnesium carbonate to basic magnesium carbonate.

After the mold has been completely charged with a suitably proportioned mixture of diatomaceous silica, bentonite, self-setting magnesium carbonate and asbestos, valves in the slurry charging pipes are closed and the mold charge is immediately cured, or at least partially cured, by application of a controlled degree of heat to the mold charge while still within the mold. During the curing operation steam or hot water at a suitable curing temperature, and under pressure approximating 5 lbs. gauge, is introduced into direct contact with all sides of the mold, or at least into contact with those faces of the mold wall area which are perforated. The steam or water thus supplied functions as a source of curing heat and also as a fluid heat-conveying medium for transferring the heat through the mold charge. In this way the necessary amount of preliminary set is imparted to the mold charge or block under cure within a comparatively brief period of 5–15 minutes. The cast block or shape is then removed from the mold and subsequent After molding slurries of the compositions given in Formulas I–V above, under a molding and dewatering pressure of 20 lbs. gauge, during which a slurry of approximately 4½% solids concentration is dewatered to an acceptable consistency of approximately 30% solids concentration; and after curing the mold charges by direct application thereto of steam under 5 lbs. pressure for a period of about 5 minutes to effect a preliminary set followed by final cure in a drying oven, insulating blocks of the following characteristics resulted:

|  | Formula I | Formula II | Formula III | Formula IV | Formula V |
|---|---|---|---|---|---|
| Dry density, lbs. per cubic ft. | 18.7 | 22.6 | 21.6 | 19.1 | 17.4 |
| Modulus of rupture, lbs. per sq. in. | 84 | 81 | 136 | 175 | 172 |
| Surface and structure | Fair | Good | Good | Good | Good |

Insulation blocks or shapes thus made from formulas incorporating approximately 12% asbestos fibre and in which the major constituents are diatomaceous silica (natural or calcined) and basic magnesium carbonate formed in situ from normal self-setting magnesium carbonate, exhibit no measurable shrinkage in volume during the molding, curing and drying operations. Consequently, the blocks can be precision molded to precise dimensions, and require no machining, planing or finishing, except possibly for a small amount of trimming on that face or edge of the block formed adjacent the slurry charging inlet of the mold.

Heat-insulating blocks which have been made in accordance with the indicated formulas are non-shrinking at the molding and curing temperatures, and they also exhibit high resistance to shrinkage or failure at elevated temperatures approximating 2000° F. Products made from formulas including diatomaceous silica which has been calcined at a temperature of 2000° F. exhibit a very small degree of shrinkage at temperatures at least as high as the temperature to which the silica component has been calcined. Such blocks have hard surfaces which are substantially dust-free; and the resulting blocks have a lower density and a higher ratio of modulus of rupture to density than any similar high temperature insulation blocks of comparable composition heretofore made. Blocks made in accordance with the present invention have a strength modulus-density ratio of at least 3 throughout a density range of 16–23 lbs. per cubic foot.

Prior to its incorporation with the other ingredients of the block, the diatomaceous earth should be reduced to finely-divided or powdered form; as for example a fineness such that 90% of the material will pass a 200 mesh screen. When the finely-divided earth is calcined, the calcining temperature should be not substantially less than 2000° F., but should not be so high as to destroy the inherent porous diatom structure.

Since many variations may be made from the illustrative details given, without departing from the scope of the invention, it is intended that the invention should be limited only by the terms of the claims interpreted as broadly as consistent with novelty over the prior art.

What we claim is:

1. A method of manufacturing a heat insulation block adapted for use at elevated temperatures comprising, forming an aqueous slurry of 4½–7½% solids concentration consisting of 35–78% dry weight of finely divided diatomaceous silica, 10–50% finely divided normal magnesium carbonate and minor proportions of bentonite and asbestos fibers, introducing a charge of the slurry under pressure into a filtering mold, partially dewatering and shaping the charge while completing the charging operation, and curing the block while confined within the mold by circulating an aqueous heating fluid under low pressure in direct contact with the mold walls and mold charge to convert the normal magnesium carbonate to basic magnesium carbonate.

2. A filter molded and cured heat insulation block retaining the mold dimensions and which exhibits very small shrinkage in use at high temperatures, consisting essentially of calcined finely divided diatomaceous silica in amounts representing 35%–72% by weight of the block and approximately 12% asbestos fibers integrally bonded with 3%–6% bentonite and 10%–50% basic magnesium carbonate formed in situ by decomposition of self-setting normal magnesium carbonate, said block having a dry density of 17–23 lbs. per cubic ft. and having a transverse strength exceeding 80 lbs. per square inch.

3. A method of manufacturing a heat insulation block adapted for use at elevated temperatures comprising, forming an aqueous slurry of 4½–7½% solids concentration comprising 35–72% dry weight of finely divided diatomaceous silica, 10–50% finely divided normal magnesium carbonate, and minor proportions of bentonite and asbestos fibers, pressure filter molding a measured charge of said slurry, partially dewatering and shaping the slurry solids to form a block while completing the molding operation, partially curing the block while confined within the mold by maintaining an aqueous heating fluid in direct contact with outer surfaces thereof to convert the normal magnesium carbonate to basic magnesium carbonate, and drying the thus cured block.

HENRY A. KIESELBACH.
EARL R. WILLIAMS.